US008988355B2

(12) United States Patent
Solomon et al.

(10) Patent No.: US 8,988,355 B2
(45) Date of Patent: Mar. 24, 2015

(54) KEYBOARD APPLIANCE FOR TOUCHSCREEN

(75) Inventors: Robert L. Solomon, Bainbridge Island, WA (US); Chad J. MacDonald, Bothell, WA (US); Steven L. Korn, Bainbridge Island, WA (US)

(73) Assignee: SoloMatrix, Inc., Bainbridge, Island, WA (US)

( * ) Notice: Subject to any disclaimer, the term of this patent is extended or adjusted under 35 U.S.C. 154(b) by 102 days.

(21) Appl. No.: 13/495,165

(22) Filed: Jun. 13, 2012

(65) Prior Publication Data

US 2013/0335327 A1 Dec. 19, 2013

(51) Int. Cl.
*G06F 3/02* (2006.01)
*G06F 1/16* (2006.01)
*G06F 3/044* (2006.01)

(52) U.S. Cl.
CPC ............ *G06F 1/1662* (2013.01); *G06F 1/1669* (2013.01); *G06F 3/0202* (2013.01); *G06F 3/0219* (2013.01); *G06F 3/0227* (2013.01); *G06F 3/044* (2013.01); *G06F 2203/04809* (2013.01)
USPC .......................................... 345/168; 345/173

(58) Field of Classification Search
CPC ... G06F 1/1616; G06F 1/1624; G06F 1/1662; G06F 1/1669; G06F 1/1692; H04M 1/0202; H04M 1/0235
USPC .................................. 345/168, 173
See application file for complete search history.

(56) References Cited

U.S. PATENT DOCUMENTS

| 4,274,752 | A  | * | 6/1981  | Huber et al. ..................... 341/33 |
| 5,990,772 | A  | * | 11/1999 | Van Zeeland ................. 200/521 |
| 7,403,191 | B2 |   | 7/2008  | Sinclair |
| 7,423,437 | B2 |   | 9/2008  | Hargreaves et al. |
| 7,612,767 | B1 |   | 11/2009 | Griffin et al. |
| 7,844,914 | B2 |   | 11/2010 | Andre et al. |
| 7,850,378 | B1 |   | 12/2010 | Ligtenberg et al. |
| 8,079,766 | B2 |   | 12/2011 | Kinney |
| 8,086,275 | B2 |   | 12/2011 | Wykes et al. |
| 2004/0206615 | A1 | * | 10/2004 | Aisenbrey ..................... 200/262 |
| 2010/0238119 | A1 | * | 9/2010 | Dubrovsky et al. ........... 345/169 |
| 2011/0057899 | A1 | * | 3/2011 | Sleeman et al. .............. 345/174 |

OTHER PUBLICATIONS

Jun. 10, 2012 printout from 4iConcepts website re "Invisible Keypad" product offering by 4iConcepts. (http://4iconcepts.com).
Jun. 10, 2012 printout from Gizmodo website of Sep. 18, 2009 product review by Danny Allen of iTwinge keyboard. Review titled: "iTwinge iPhone Keyboard Video Makes Me Cringe a Little Less." ( http://gizmodo.com/5362350/itwinge-iphone-keyboard-video-makes-me-cringe-a-little-less ).

(Continued)

*Primary Examiner* — Kevin M Nguyen
(74) *Attorney, Agent, or Firm* — Steven P. Koda

(57) ABSTRACT

A keyboard activates areas of a touchscreen according to user interaction with the keyboard. A discharge circuit provides a discharge path for altering the electrostatic field of the touchscreen. Such discharge circuit excludes the user's finger (or stylus). Instead of grounding to the user, a ground plane in varying embodiments may be contained within the keyboard, or be formed at least in part by by the case of the keyboard, the case of the host device, or the ground plane of the host device. The keyboard includes an electrical ground member to absorb the capacitive discharge and/or conduct such discharge to the ground plane.

38 Claims, 13 Drawing Sheets

(56) References Cited

OTHER PUBLICATIONS

Jun. 10, 2012 printout from TechRice website of Sunny Ye Aug. 24, 2011 article titled, "The SmartKeyboard Concept: Dammit, I Want an iPhone and a Physical Keyboard Too" ( http://techrice.com/2011/08/24/the-smartkeyboard-concept-dammit-i-want-an-iphone-and-a-physical-keyboard-too/ ).

Jun. 10, 2012 printout of the "How it Works" web page from Touchfire website re Touchfire screentop keyboard. ( http://www.touchfire.com/how-it-works/ ).

* cited by examiner

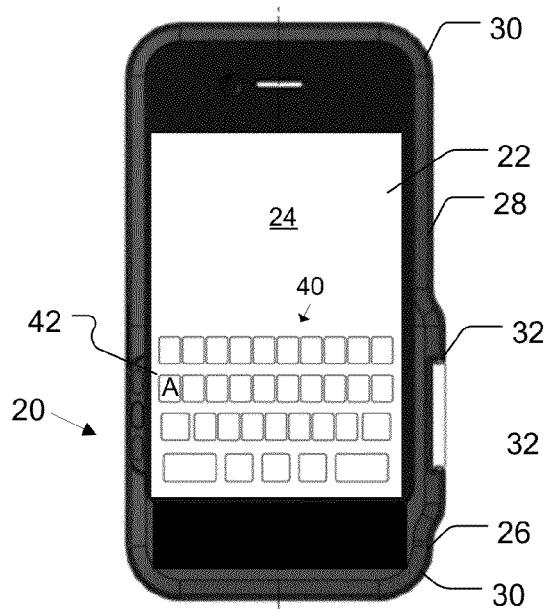
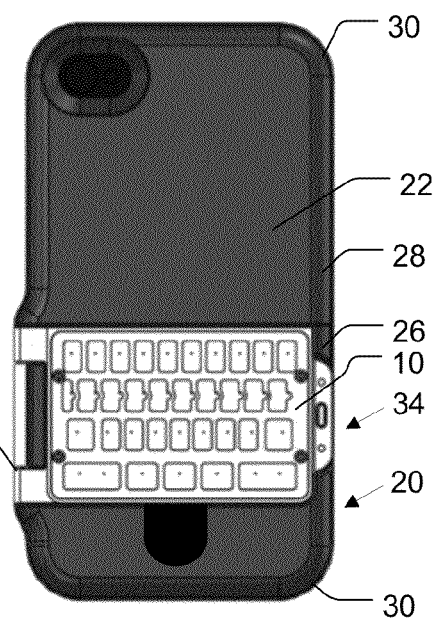
Figure 3　　　　Figure 4
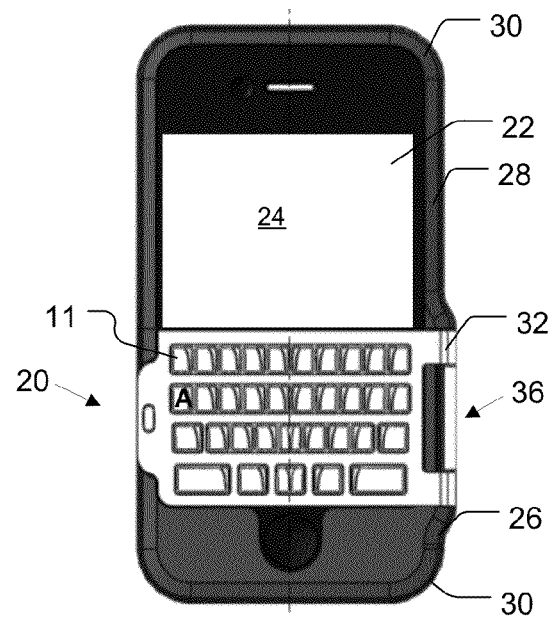
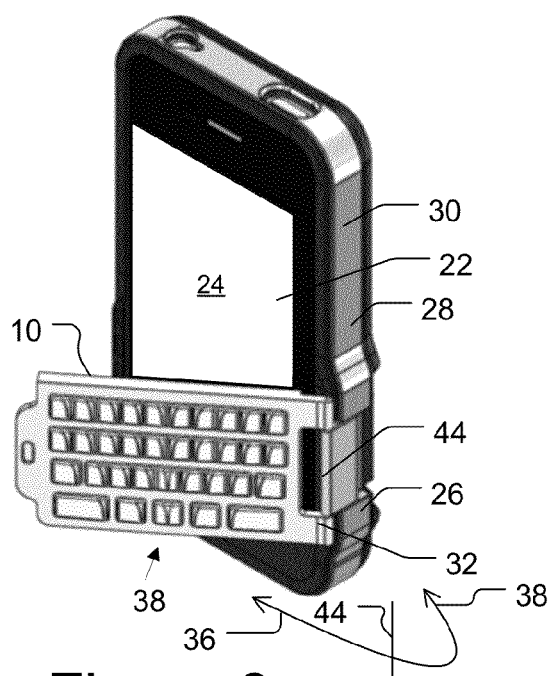
Figure 5　　　　Figure 6

KEYBOARD APPLIANCE FOR TOUCHSCREEN

BACKGROUND OF THE INVENTION

This invention relates generally to the fields of keyboards and touchscreens, and more particularly to the field of external keyboards which activate keys of a touchscreen keyboard.

A touchscreen is an electronic visual display that can detect the presence and location of a touch within the display area. The term generally refers to touching the display of the device with a finger or hand. Touchscreens can also sense other passive objects, such as a stylus. Touchscreens are common in devices such as game consoles, all-in-one computers, tablet computers, and smartphones.

The touchscreen has two main attributes. First, it enables one to interact directly with what is displayed, rather than indirectly with a pointer controlled by a mouse or touchpad. Secondly, it lets one do so without requiring any intermediate device that would need to be held in the hand (other than a stylus, which is optional for most modern touchscreens). Such displays can be attached to computers, or to networks as terminals. They also play a prominent role in the design of digital appliances such as the personal digital assistant (PDA), satellite navigation devices, mobile phones, and video games.

The popularity of smartphones, tablet computers, portable video game consoles and many types of information appliances is driving the demand and acceptance of common touchscreens, for portable and functional electronics. With a display of a simple smooth surface, and direct interaction between the user and content, fewer accessories are required. For example, some devices display a virtual keyboard on the touchscreen (referred to herein as a touchscreen keyboard). Select areas of the touchscreen correspond to respective keys of the touchscreen keyboard. A user may type in characters by sequentially touching corresponding keys of the touchscreen keyboard, similar to the way one would type in characters on an actual keyboard or keypad.

Although the touchscreen keyboard allows a host device to be used without an external keyboard, users may prefer the tactile feel and response of an actual keyboard. Some devices may allow an external keyboard to be connected to the device and used as an alternative to the touchscreen keyboard to generate inputs. However, such keyboards require the host device to have a port for connecting the keyboard. This is undesirable in smaller host devices such as smartphones where the keyboard port would increase the size and weight of the device.

Other devices are overlain on the touchscreen keyboard and work by activating a key of the touchscreen keyboard via the overlain device. Such overlain device may simply be a transparent sheet having bumps that provide a tactile guide for the respective touchscreen keys. Some overlain devices may include distinct keycaps. Conventional overlain devices, however, are unreliable resulting in key inputs not being activated, the neighboring key being activated, and/or multiple keys being activated. Accordingly, there is a need for a more reliable keyboard appliance for activating keys of a touchscreen keyboard.

Further, with regard to hand-held devices there is a need for a keyboard appliance that is convenient to use. These and other needs are addressed by various embodiments of the present invention.

SUMMARY OF THE INVENTION

The present invention is directed to a keyboard that activates areas of a touchscreen according to user interaction with the keyboard. A user, for example, may apply a pressing force with a pressure source (e.g., user finger tip) to press a key of the keyboard that activates a corresponding area of the touchscreen. Improved input reliability is achieved by forming a reliable, discriminating discharge circuit that better correlates the appliance key to a touchscreen region (e.g., a touchscreen keyboard key). The discharge circuit provides a discharge path for the touched area of the touchscreen. Of particular significance is that the discharge path excludes the user's finger (or stylus). Instead the circuit discharges to a local ground plane. Such ground plane in varying embodiments may be contained within the keyboard, or be formed by the case of the keyboard, the host device, the case of the host device, the ground plane of the host device, or a combination of two or more of these. The host device is the device with which the keyboard is used, and within which the touchscreen is provided. For each embodiment, the keyboard includes a diaphragm, all or a part of which is electrically conductive for absorbing the capacitive discharge (e.g., and serve as the ground plane) or conducting such discharge to the ground plane.

The present invention also is directed to a keyboard that is convenient to use with a hand-held device having a touchscreen. In a given embodiment, a keyboard is hinged to a frame, which fits onto the hand-held device. The keyboard has various positions. In an operable position the keyboard overlays a portion of the touchscreen. The keyboard may swing about a hinge to move off the touchscreen. In one embodiment the keyboard may swing approximately 360 degrees to be positioned at the backside of the host device into a storage position. In another embodiment the keyboard may swing to a lesser degree to move off the touchscreen into a temporary position, which allows the user to view the touchscreen area that otherwise would be covered by the keyboard. In some embodiments the frame with the keyboard may slide onto and off the host device. Oriented in one manner, the frame slides onto the host device so that the keyboard overlies the touchscreen and takes the operable position. Oriented in an opposite manner, the frame slides onto the host device so that the keyboard is at the backside of the host device in a storage position, leaving the touchscreen visible and uncovered.

The inventions will be better understood by reference to the following detailed description taken in conjunction with the accompanying drawings.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings:

FIG. 3 is a front view of a smartphone having the keyboard appliance fitted in the storage position, according to an embodiment of this invention;

FIG. 4 is a back view of the smartphone having the keyboard appliance fitted in the storage position, according to an embodiment of this invention;

FIG. 5 is a front view of a smartphone having the keyboard appliance fitted in the operable position, according to an embodiment of this invention;

FIG. 6 is a perspective view of a smartphone having the keyboard appliance fitted in the storage position and the keyboard swung outward toward a temporary position, according to an embodiment of this invention;

DETAILED DESCRIPTION OF ILLUSTRATIVE EMBODIMENTS

Figure 1:
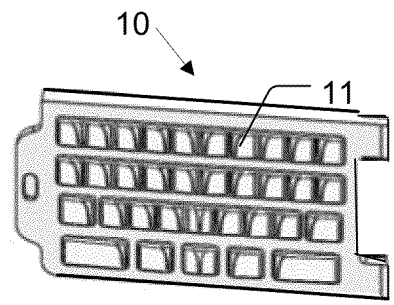
FIG. 1 is a perspective view of a keyboard according to an embodiment of this invention.
Figure 2:
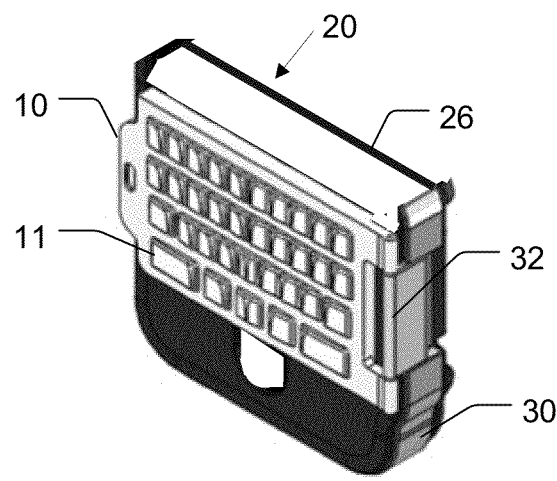
FIG. 2 is a perspective view of a keyboard appliance according to an embodiment of this invention.

In the following description, for purposes of explanation and not limitation, specific details may be set forth, such as particular terminals, devices, components, techniques, protocols, interfaces, hardware, etc. in order to provide a thorough understanding of the present invention. However, it will be apparent to one skilled in the art that the present invention may be practiced in other embodiments that depart from these specific details. Detailed descriptions of well-known computers, terminals, devices, phones, components, techniques, protocols, interfaces, and hardware are omitted so as not to obscure the description of the present invention.

The Problem

With regard to all known conventional overlain appliances applied to a capacitive touchscreen keyboard, the devices work by allowing the electrostatic field of the touchscreen switch to be altered by a discharge path through the overlay to the user's fingertip—similar to the way it would if the overlay were not present. However, such discharge path has been unreliable, resulting at times in the intended key input not being activated, or a neighboring key being inadvertently or erroneously registered by the touchscreen.

One of the challenges when discharging through the contact finger is the wide variation in conductivity of the finger, depending on the person and the present moisture or dryness of the finger. Also, when the user's fingers touch more than one key (such as incidently) the capacitance of the discharge path formed by the overlain appliance and finger(s) may change. For example, it is possible that "ghosting" or increased noise due to capacitive effects may occur if fingers are placed too close together or cover too much of the keyboard.

Another challenge with discharging through the contact finger is that the host device will not recognize an input when non-conductive contact is made with the key, such as with a fingernail or gloved finger.

A more effective, reliable, and discerning keyboard overlay is presented herein. In particular, total capacitance of the keyboard is kept at a desired level while also providing discrete key circuits. Parasitic capacitances and other capacitive noise is minimized. Of significance is that rather than have the touchscreen discharge to the user fingertip through the key cap touched by the user's fingertip, an alternative ground structure is provided. Although discharge from the ground structure may eventually flow back to a user holding a host device, at the time of key activation, the discharge path flows into the ground structure rather than through the key cap. Also of significance is that an air gap is provided for each key. A given air gap is traversed only for when the corresponding key is activated.

Advantages of the keyboard according to embodiments of the current invention are that key input detection by the host device is reliable under various atmospheric environments and user physiological constitutions. Further, by using non-conductive materials the need to maintain conductivity through key cap layers of coating, ink for legends, etc. is avoided.

Overview

FIG. 1 shows a keyboard 10 according to an embodiment of the invention. The keyboard 10 includes a plurality of keys 11 which a user may press to provide input to a host device (not shown). The layout of keys 11 may correspond to an AZERTY, QWERTY, Latin, Cyrillic, numeric keypad, or other layout. The number of keys 11 may vary according to the embodiment. Each key 11 may be blank, include printed matter, or include depictions. For example, each key may represent an alphanumeric character, special character, symbol, idiographic character, icon or symbol in any language.

In a preferred embodiment a key 11 may be discerned by touch. For example, each key 11 may be elevated relative to an immediately surrounding area. In another embodiment, the keys 11 may be flush with the immediately surrounding area, but have a different softness or texture than the immediately surrounding area. In still another embodiment the keys may be slightly depressed or dimpled. Further, one or more keys may have a different tactile feel than other keys, (e.g., a raised portion) to facilitate easier touch typing. In another embodiment each key may have a different tactile feel, such as in a Braille keyboard embodiment. In another embodiment the keys may be flat and not tactiley distinct at their edges, but include a raised portion to tactilely identify a general area of a key. In still another embodiment the keys may not be tactilely distinct from each other. In still another embodiment the keys may not be tactilely distinct from each other, but the keyboard may include visual or tactile indicators that enable a user to more readily discern different areas of the keyboard.

The keyboard 10 may be scaled to provide different keycap sizes and different keyboard dimensions according to the dimensions of a touchscreen keyboard of a host device. The host device may be any device having a touchscreen. The keyboard 10 is overlain onto the host device's touchscreen and used to activate areas of the touchscreen (e.g., touchscreen switches), thereby providing input to the host device. Examples of host devices include, at the least, tablet computers, smartphones, personal digital assistants (PDA), satellite navigation devices, mobile phones, video games systems, portable and non-portable video game consoles, table-top computers, all-in-one computers, copier and multi-function peripheral devices, and many other types of computing systems and information appliances. A host device also may be a touchscreen display that serves as an input peripheral or an input/output peripheral for any computing device or information appliance, such as those listed above as examples of host devices. For convenience, the detailed description of the keyboard is described with regard to an embodiment for a smartphone, mobile phone, GPS device, or other handheld device having a touchscreen, although the keyboard is not intended to be limited to such a form factor or size.

Keyboard Appliance

FIGS. 2-8 shows a keyboard appliance 20 having a keyboard 10 for use with a hand-held host device 22 having a touchscreen 24. The appliance 20 includes a first housing 26 (also referred to herein as a frame) that slides onto the hand-held host device 22. In some embodiments the appliance 20 also includes a second housing 28 that slides onto another portion of the hand-held host device 22. For example, the first housing 26 includes the keyboard 10 and slides onto a bottom portion of the host device 22, and the second housing 28 slides onto the top portion of the host device 22. The first and second housing 26, 28 may include sections that frame the top edge, bottom edge, and side edges of the host device 22 and serve as a bumper 30 that protects the hand-held host device 22 from damage, (e.g., such as in the event of being dropped).

The first housing 26 may be fitted to the hand-held host device 22 with the keyboard 10 on the front side, as shown in FIGS. 5 and 6, or on the rear side, as shown in FIGS. 3 and 4. In particular, FIGS. 3 and 4 shows the keyboard appliance as configured to have the keyboard 10 in a storage position 34 with the keyboard on the back face of the hand-held host device 22. While in the storage position 34, a user can readily access all of the touchscreen 24 and provide inputs by touching the touchscreen with their finger (or a stylus).

To use the keyboard 10, the user pulls off the housing 26, flips it around, then slides the housing 26 back onto the host device 22. The keyboard 10 is thereby placed into the operable position 36, as shown in FIG. 5. In the operable position 36, the keyboard 10 is overlain onto the touchscreen 24. In the operable position 36, a back face (or at least operable parts of the back face—e.g., active pads) of the keyboard 10 is flush with and in contact with the touchscreen 24. From the operable position, a user may press keys 11 of the keyboard 10 to activate areas of the touchscreen. Thus, rather than have a user touch the touchscreen 24 with their finger, they touch it via the keyboard 10. Accordingly, the finger serves as a pressure source for applying a pressing force to a key. The keyboard 10 is particularly useful as an overlay to a touchscreen keyboard 40. Active pads corresponding to the keys 11 of the keyboard 10 are aligned with corresponding touchscreen keys 42. When a given key 11 is pressed, a corresponding key 42 of the touchscreen keyboard 40 is activated. The details of the activation process and structures are discussed more extensively below.

As an added convenience to the user, the keyboard 10 is mounted to the housing 26 by a mounting structure 32. The mounting structure 32 may be a hinge, a tether, or other structure that allows the keyboard to move into and out of the operable position without moving the entire first housing 26. The keyboard may swing about the mount to move off the touchscreen. The mounting structure 32 may be positioned at either side or toward the bottom of the housing 26. In the embodiment illustrated the mounting structure 32 is located at the right side of the housing 26. In an example embodiment a hinge is implemented. The user may swing the keyboard 10 away from the host device 22 rotating the keyboard 10 about a hinge axis 44. The keyboard 10 may be moved from the operable position 36 into any of various temporary positions 38 in which the touchscreen 24 is uncovered and accessible for direct touch by the user. In a specific embodiment the mounting structure 32 allows rotation between 0 degrees (i.e., the operable position) to an end of rotation position at 120 degrees. In other embodiments the end of rotation may be greater or lesser. For example in another specific embodiment the end of rotation may exceed 180 degrees relative to the operable position.

Figure 8:
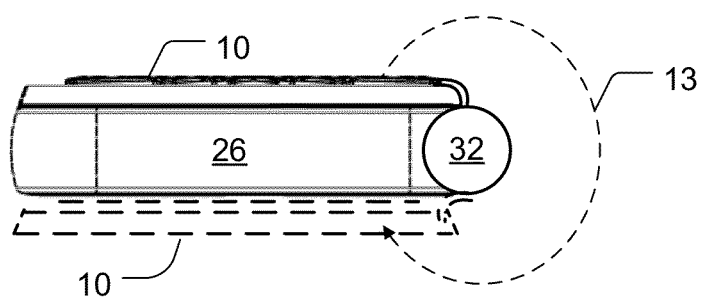
FIG. 8 is a diagram of a keyboard appliance in which the keyboard may rotate approximately 360 degrees, according to an embodiment of this invention.

In still another embodiment the keyboard 10 may rotate along a path 13 approximately 360 degrees to swing around to the backside of the housing 26 (and hand-held device), as shown by the real and phantom views of the keyboard 10 in FIG. 8. In such embodiment the connector 32 may include a complex hinge including a first larger hinge defining a path for the keyboard to move about a wide arc. A second hinge may be formed at the periphery of the first hinge to allow the keyboard to rotate about the second hinge as the keyboard and second hinge move about a path 13 defined by the first hinge. Such a hinge structure enables easier end of path seating so that the keyboard 10 may be flush with the host device when at either the front or back side of the host device. In such embodiment the keyboard also may be secured at such end of rotation back side position (e.g. such as by a magnetic latch). The end of rotation position serves as the storage position. Accordingly, in such alternative embodiment the housing 26 need not be pulled off and turned around to switch between the operable position and the storage position.

Figure 7:
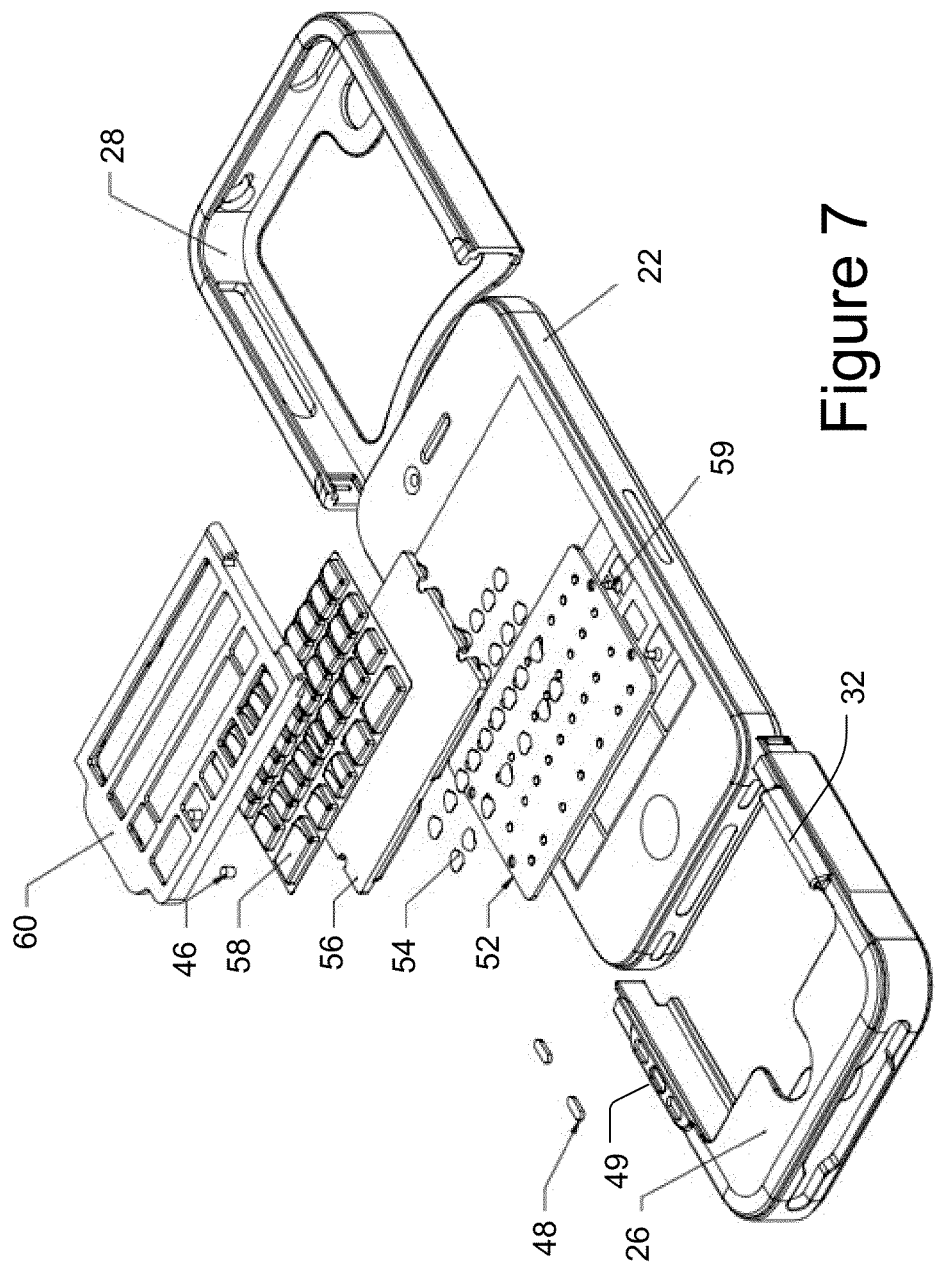
FIG. 7 is an exploded view of the keyboard appliance in relation to a smartphone, according to an embodiment of this invention.

Referring again to the embodiment of FIG. 7, a latch 46 may be included which latches the keyboard 10 to the housing 26 in the operable position so that the keyboard does not swing unintentionally out of the operable position. For example, a magnet latch 46 is provided toward, at or near a keyboard edge opposite the hinge axis 44. The magnetic latch 46 and the mounting structure 32 thereby hold the keyboard in a secure position preventing unwanted swinging of the keyboard 10 about the hinge axis 44. In order to move the keyboard 10 out of the operable position 34, the user must overcome the magnetic attraction formed by the magnet latch. Once pulled apart, the keyboard may be rotated about the axis 44. One or more bumpers 48 also may be included to cushion the keyboard 10 as it seats to the housing 26 by the attraction of the magnetic latch 46. As shown in FIG. 7, the magnet is attracted to a seat 49 toward one side of the housing 26 between the bumpers 48.

In a specific embodiment the mounting structure 32 may be a conventional hinge, such as one having a post which serves as an axis and surrounding cylindrical surfaces which move about the circumference of the post, (e.g., similar to a door hinge). In another embodiment, corresponding convex and concave bearing surfaces may be aligned to form the axis. The keyboard rotates by the relative movement of the convex bearing surface(s) in the concave bearing surface(s). In another embodiment a flexible strap may serve as the mounting structure. For example the strap may be integral to or coupled to either one or both of the keyboard and the housing 26, and hold the keyboard 11 to the housing 26. The keyboard may move relative to the housing 26 based on the flexibility of the strap.

Touchscreen

The host device includes a touchscreen, such as a capacitive touchscreen with which the keyboard 10 is to be used. A capacitive touchscreen panel includes an insulator such as glass, coated with a transparent conductor such as indium tin oxide. The conductor layer is charged resulting in an electrostatic field at the touchscreen. For example in a surface capacitance technology, only one side of the insulator is coated with the conductive layer. A small voltage is applied to the layer, resulting in a uniform electrostatic field. When a conductor, such as a human finger, touches the uncoated surface, a capacitor is dynamically formed, and a distortion occurs to the screen's electrostatic field, measurable as a change in capacitance. Specifically, some of the charge at a local area of the touchscreen is transferred to the user, so the charge on the conductive layer decreases. Different technologies may be used to charge the conductive layer and to determine the location of the touch. The location is sent to a controller for processing, where the location along with a correlation to what is displayed at the location are used to determine the user input. There are various capacitive touchscreen technologies for setting up the electrostatic field and for determining the location of the touch, such as projected capacitance, mutual capacitance and self-capacitance techniques and sensors.

Although various capacitive touchscreen technologies are listed above, the keyboard 10 may be used with any touchscreen that identifies a touch location as a location where charge is at least in part absorbed by a finger's touch. Accordingly the term touchscreen as used herein is intended to include a display panel (and associated electronics) that identifies a touch location at the panel as a location where charge may be at least in part absorbed by a finger's touch.

Keyboard Components

There are various embodiments of the keyboard 10. In one embodiment, as shown in FIG. 7, the keyboard 10 includes a circuit board 52, a plurality of contact switches 54, a diaphragm 56, and a key cap structure 58. In some embodiments the contact switches 54 are omitted. In some embodiments a cover plate 60 is included. For example, the cover plate 60 may be fastened to or include a part of the mounting structure 32 in a hand-held embodiment. As illustrated in FIG. 7, the mounting structure 32 may be formed by concave and convex bearing surfaces that are mated and aligned to form a hinge axis, or by pins which define a hinge axis. Other mounting structures as described above may be implemented in other embodiments.

The circuit board 52 forms a base component, which is in physical contact with the touchscreen 24 of the host device during operation of the keyboard 10. Other layers in order going away from the touchscreen are a layer of contact domes 54, the diaphragm 56, and the key cap structure(s) 58. In some embodiments a spacer structure 82 (See FIG. 15) having openings 84, such as for the contact domes 54, may be located between the diaphragm 56 and the circuit board 52.

Circuit Board 52:

The circuit board 52 may be a printed circuit board formed by one or more layers integrated into a common one-piece structure. The circuit board 52 is formed by nonconductive materials, but also includes areas formed by circuit materials such as conductive material or wiring. For example, the circuit board 52 may be formed by ABS plastic, or other nonconductive material. Various processes may be used to form the circuit board 52 and circuits thereon. For example, conventional printed circuits, flex circuits, conductive ink printed circuits, rubber sheet PCB materials, and/or other technologies may be used. Also various fabrication technologies may be used, such as a molded or machined substrate with molded or cast conductive materials used for the pads, vias and contacts. In some embodiments a flexible, machined, molded or cast PCB is desired so that the circuit board 52 may conform to touchscreen surfaces of differing shapes, e.g., flat; curved. In an example working embodiment the circuit board 52 for a keyboard used with a smartphone is 0.062 inches thick. Differing thicknesses however may be used for keyboards used with smartphones or with other host devices.

Figure 9:
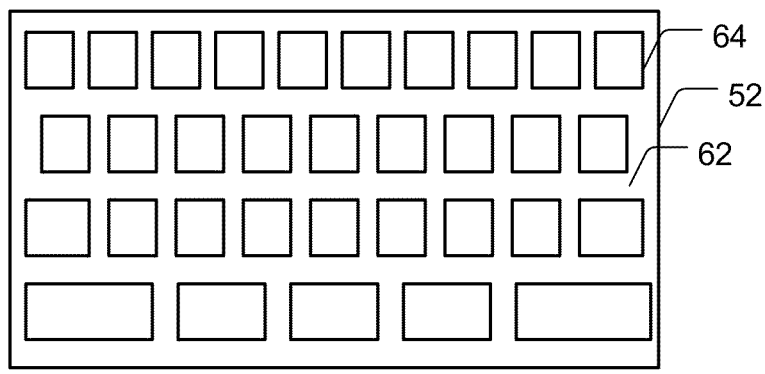
FIG. 9 is a top view of a circuit board of a keyboard, according to an embodiment of this invention.
Figure 10:
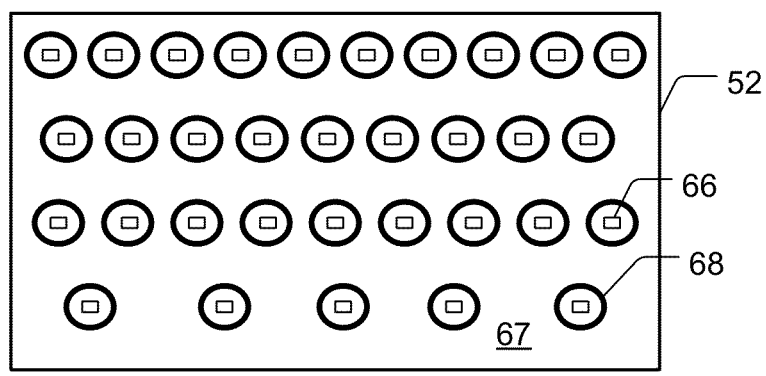
FIG. 10 is a bottom view of a circuit board of a keyboard, according to an embodiment of this invention.
Figure 11:
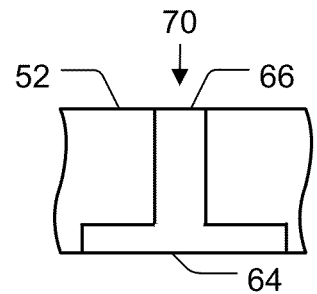
FIG. 11 is a partial cross sectional view of the circuit board showing a conductive path segment.

Referring to FIGS. 9-11, the circuit board 52 is an undermost component of the keyboard 20, and is positioned in contact with the touchscreen 22 when operating the keyboard 20. A surface 62 of the circuit board 52 faces the touchscreen 22. Along the surface 62 is a plurality of pads 64. There is at least one pad 64 for each key 11. The pads 64 are sized, shaped, and arranged to generally align with a set of touchscreen virtual keys 42. A non-exact alignment is preferred because the touchscreen may display different keyboards, in which the virtual keys of one virtual keyboard do not exactly align with the virtual keys of another virtual keyboard (e.g., virtual keys corresponding to capitals may be slightly offset to the virtual keys for non-capital letters). The specific positions of the pads 64 therefore are implemented to insure that the pads 64 align with the touchscreen areas for the corresponding keys of each of the various virtual keyboards. As a result a pad may be slightly offset relative to its corresponding virtual key for one or more, or all, of the virtual keyboards. In a specific embodiment a pad area (i.e., area of one or more structures serving as a pad for a given key) has an area that is approximately one-third the area of the corresponding virtual key 42, although other sizes may be used. Such one-third the virtual key area is chosen to include the capacitive switches or other touchscreen localization points for each corresponding virtual key of each virtual keyboard.

Each pad 64 is formed by a conductive material, such as produced by conventional printed circuit board technology. In some embodiments each pad may be formed with electrically conductive epoxy. In some embodiments each pad may be nickel-plated or gold-plated. Each pad 64 is coupled to a conductive area 66 on the opposite surface 67 of the circuit board 52. For example, for an embodiment in which there is one pad 64 for a given key, there is a corresponding one area 66, and a corresponding conductive length (e.g., via) connecting the two. In embodiments in which there are multiple pads for a given key, there is at least one conductive area 66 to which the multiple pads of the given key are coupled—via traces and/or vias (i.e., conductive length). Each conductive area 66 and each conductive length connecting a pad 64 to an area 66 also may be produced by conventional printed circuit board technology and may be formed of the same or differing materials than the pads 64.

Each pad 64 and its corresponding conductive area 66 are in electrically conductive communication and form a circuit path segment 70. For each key 11, there is at least one distinct circuit path segment 70 formed on the circuit board 52. Although the pad 64 and its corresponding area 66 are shown as being in overlaying alignment, in other embodiments the pad 64 and its corresponding area 66 may be offset or in distant positions relative to the respective surfaces 62, 67. Printed circuit board technology allows the connection between the pad 64 and its corresponding contact area 66 to follow many different possible paths. A direct path as illustrated is preferred, however, to minimize noise and possible parasitic capacitance effects among the circuit path segments 70. Regardless of the relative positions of a pad 64 on surface 62 and its corresponding area 66 on surface 67, the pad 64 and area 66 are in electrical communication through the circuit board 52 to define a distinct circuit path segment 70.

In preferred embodiments the surface area of a pad 64 is larger than the surface area of its corresponding contact 66. In an alternative embodiment the surface areas are the same, such as for a pad that has a thickness extending through the circuit board 52. In an alternative embodiment described below in more detail (see FIG. 20), each pad 64 may be formed by a set of smaller pad-like structures linked together by conductive traces.

Contact Switches 54:

For each key 11, in some embodiments there also may be at least one contact switch 54 (see FIG. 7). In a preferred embodiment each contact switch 54 is formed by a deformable conductive dome-shaped member, (also referred to herein as a contact dome 54). The contact domes 54 are seated on the surface 67 of the circuit board 52 away from the touchscreen 24. FIG. 10 shows a seat 68 for each contact dome 54. The contact dome 54 protrudes away from the surface 64 and has an apex toward the diaphragm 56 above. The rim of the contact dome sits on a non-conductive portion (e.g., seat 68) of the circuit board 52. In particular, the rim of the contact dome 54 is not in electrical communication with a corresponding circuit path segment 70. In a normal relaxed state (where a key is not being pressed), there is no portion of the contact dome 54 in electrical communication with the corresponding area 66 of circuit path segment 70. When a key is pressed, a corresponding contact dome 54 is pressed and thereby deformed to move the dome apex downward into contact with the corresponding conductive area 66, and thus, with the corresponding circuit path segment 70. Although FIG. 10 depicts seats 68 having a shape of a contact dome's rim, the circuit board 52 need not have visible markings or surface variations where the contact domes 54 seat to the circuit board 52.

Figure 12:
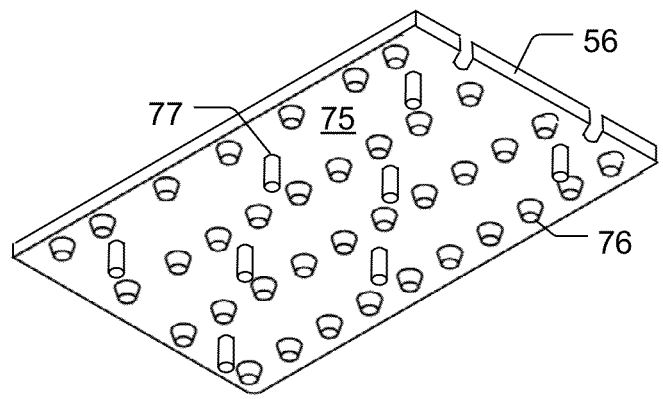
FIG. 12 is a perspective view of an underside of a diaphragm of a keyboard, according to an embodiment of this invention.
Figure 13:
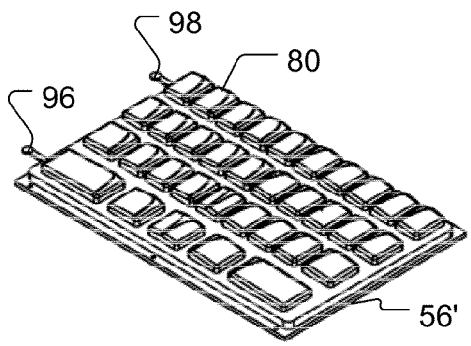
FIG. 13 is a perspective view of a portion of a keyboard having keycaps directly attached to the diaphragm, according to another embodiment of this invention.
Figure 19:
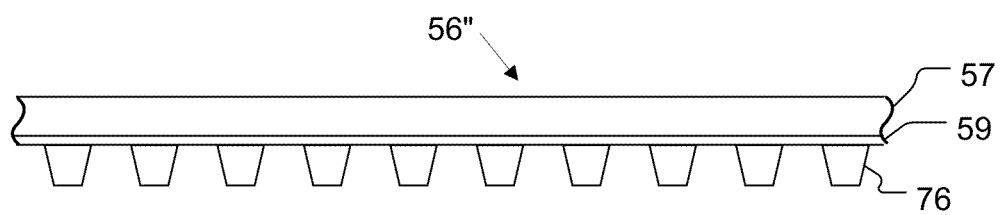
FIG. 19 is a diagram of a diaphragm component, according to yet other embodiments of the invention.

Diaphragm 56:

Referring to FIGS. 7 and 12, the diaphragm 56 is situated between the circuit board 52 and the key cap structure(s) 58, and in embodiments with contact domes 54, between contact domes 54 and the key cap structure(s) 58. The diaphragm 56 has electrically conductive and physically deformable properties. In one embodiment, the diaphragm 56 is formed by silicone material infused with carbon particles, where the amount of carbon determines the level of conductivity. In another embodiment, (See FIG. 19) the diaphragm 56" has a non-conductive deformable portion 57 and a conductive portion 59. The non-conductive portion 57 is formed by non-conductive rubber, although in other embodiments the non-conductive material may be a deformable material other than rubber. In varying embodiments the conductive portion 59 may be formed by a conductive coating (e.g., conductive paint), conductive traces, a conductive foil, or a thin flexible circuit board having conductive segments. The non-conductive portion 57 and conductive portion 59 may form an integral structure or be adjacent structures. The conductive portion 59 includes portions extending to the tips of the actuator posts 76. The actuator posts 76 may be part of the conductive portion 59, or have conductive portions that are part of the conductive portion 59. For example, the conductive coating, traces, traces of the thin flexible circuit board, or foil may extend to the tips of the actuator posts 76. Alternatively the actuator posts 76 may be part of the thin flexible circuit board. The conductive portion 59 may be positioned at a side of the diaphragm facing the circuit board 52, or at least have portions facing the circuit board 52 (so as to be able to move into contact with a contact 66 or snap dome 54, according to the embodiment). In each embodiment the diaphragm is deformable, and all or a portion of the diaphragm is electrically conductive.

In an example embodiment, the side 75 of the diaphragm 56 facing the contact domes 54 includes a plurality of actuator posts 76 and spacer posts 77. The spacer posts 77 extend into physical contact with nonconductive areas of the circuit board 52, and serve to provide a normal relaxed spacing between the diaphragm 56 and the circuit board 52. In other embodiments a separate spacer structure 82 (See FIG. 15) may be used.

There is an actuator post 76 for each contact dome 54—in embodiments having contact domes—and for each contact 66—in embodiments without contact domes. There is at least one actuator post 76 for each key 11. Each actuator post 76 protrudes from a base toward its corresponding contact 56/contact dome 54. In some embodiments the actuator post 76 extends into contact with its corresponding contact dome 54 during a normal relaxed key state (in which the key is not being pressed). Preferably, the spacer posts 77 are of a height that determines that the actuator post just contacts its corresponding contact dome 54 without compressing such contact dome 54. In other embodiments and more preferably, the spacer posts 77 are of a height that provides a gap between the apex of each contact dome 54 and its corresponding actuator post 76, or in embodiments without contact domes between the contact 66 and the corresponding actuator post 76. The air gap is desired to avoid or at least reduce noise and parasitic capacitance effects between the contacts 66/domes 54 and the diaphragm 56. In an example embodiment, an air gap of approximately 0.012 inches is implemented, although the specific gap distance may vary in other embodiments. For keyboards scaled for smartphones air gaps of approximately 0.008 inches or greater have been found to avoid the noise and parasitic capacitances that make operation less reliable.

When a key is pressed an underlying portion of the diaphragm 56 is moved. The physical displacement or deformation at the key 11 displaces the local area of the diaphragm and thereby displaces a corresponding underlying actuator post 76. The actuator post 76 moves into contact with the corresponding contact dome 54 collapsing the dome 54. By including actuator posts (as compared to a flat undersurface), the contact is more precise and limited to contact between the actuated post 76 and the desired corresponding contact dome 54. Maintaining separation away from the other non-corresponding contact domes 54 is desired to limit noise and parasitic capacitance, and to avoid unintended registration/activation for an adjacent key. In various embodiments the shape of the actuator posts 76 may vary. For example, an actuator post 76 may be a mere protrusion in which the protrusion height is less than a diameter (or other length measure) of the protrusion.

Key Cap Structure 58:

Referring again to FIG. 7, the key cap structure 58 may be a single unitary structure embodying all the keys 11. In various embodiments the unitary structure is formed by non-conductive silicone material, rubber material, or another deformable material. In other embodiments the unitary structure may be formed by non-conductive plastic material having a very fine web of support structures for holding up respective areas forming each key. It is desirable that the key caps be non-conductive so as to isolate the user's fingers from the discharge path of the touchscreen 24. Alternatively, it is preferred that there is at least a layer of nonconductive material between the diaphragm 56 and the user's fingers so as to isolate the user's fingers from the discharge path of the touchscreen 24. Such isolation layer may be the outer surface of the key cap structure 58, another layer of the key cap structure 58, the entire keycap structure 58, or a separate layer interposed anywhere between the diaphragm 56 and the keyboard areas contacted by the user's fingers for entering touchscreen inputs. For embodiments in which there is a separate, independent key cap structure for each key, each key cap structure may be formed by a rigid material or by a deformable material. In an example embodiment the key caps are formed by a plastic material, and a very fine web of support structures is included for holding up each key cap. If rigid, then each key cap will travel when pressed. If deformable, then as per the unitary structure the key cap for the pressed key will deform to in a sense travel and move the corresponding diaphragm actuator post 76. Other features and variations of the keys and key caps have been described above in the overview section.

Alternative Embodiments

In addition to the variations described above, an alternative embodiment is now described with regard to FIGS. 13-18. In the embodiment illustrated in FIG. 7, a side of the diaphragm facing the key cap structure 58 is depicted as being generally flat. Similarly, the underside of the illustrated key cap structure 58 is depicted as being generally flat. In an alternative embodiment the diaphragm 56' includes contoured or elevated key areas 78 on a surface facing away from the touchscreen 24 (while the keyboard is in operation). Thus, rather than have a unitary key cap structure separate from but in planar contact with the diaphragm, the two are combined into one unitary structure. However, in such combined unitary structure—diaphragm 56'—the structure implements the conductive and deformable properties of the diaphragm 56. Thus, each elevated key area 78 of diaphragm 56' corresponds to a key 11 and is formed by a conductive material.

Each elevated key area 78 has a corresponding nonconductive key cap 80. The key cap may have any desired texture, and may be permanently or removably attached to its corresponding key area 78, according to differing embodiments. In some embodiments, the key caps 80 have a symbol for identifying the key 11 of the keyboard. In other embodiments, the key caps 80 are transparent and a symbol is on the corresponding key area 80 of the diaphragm 56'.

Figure 14:
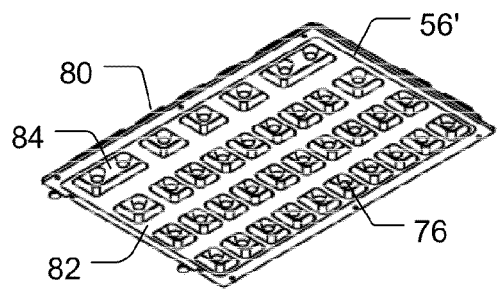
FIG. 14 is an underside perspective view of the keyboard portion of FIG. 13.
Figure 15:
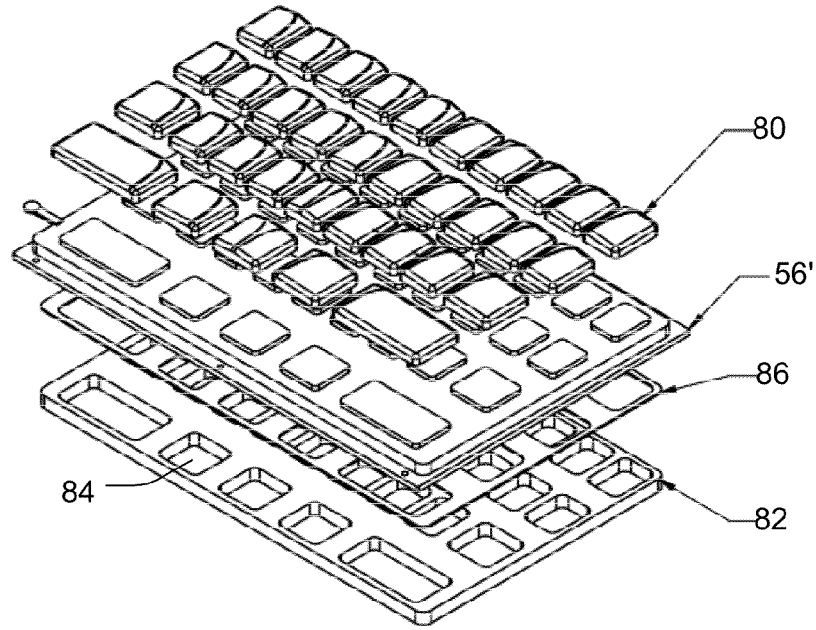
FIG. 15 is an exploded view of the keyboard components of the keyboard portion shown in FIG. 13.
Figure 16:
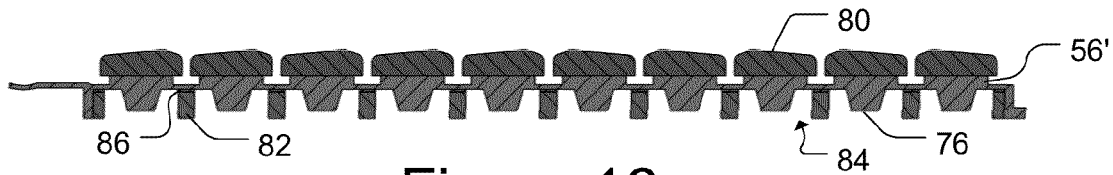
FIG. 16 is a sectional view of the keyboard components of the keyboard portion shown in FIG. 13, as taken along the top row of the keyboard.
Figure 17:
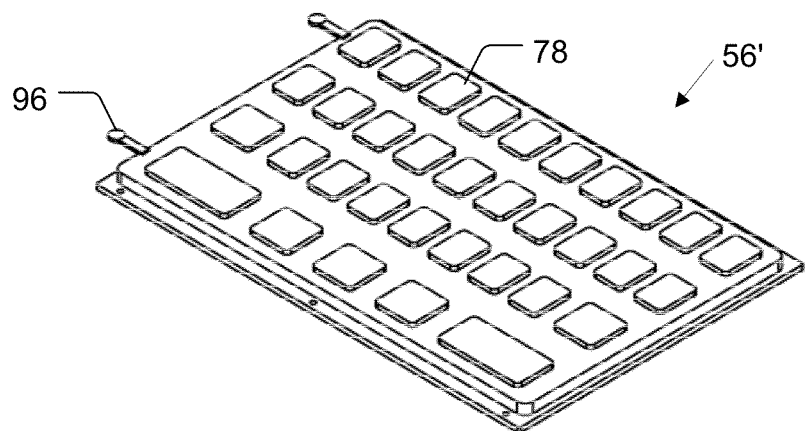
FIG. 17 is a perspective view of a diaphragm component, according to another embodiment of the invention.
Figure 18:
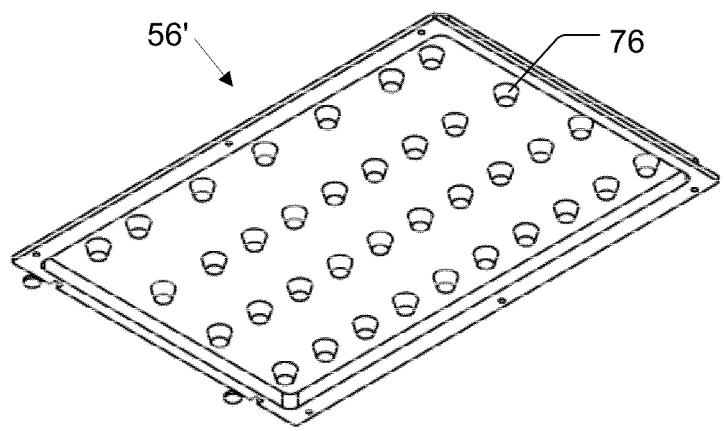
FIG. 18 is an underside perspective view of the diaphragm component of FIG. 17.

Also included in the embodiment, as shown in FIGS. 14-15 is a rigid support spacer 82 which spaces the diaphragm 56' from the circuit board 52. The spacer 82 is formed by a nonconductive material and has a plurality of openings 84 corresponding to the keys 11, key areas 78, actuator posts 76, and circuit board pads 64 and areas 66. An actuator post 76 at an underside of the diaphragm 56' protrudes into the corresponding opening 84. The area of an opening 84 is more than the cross sectional area of the actuator post 76 within the opening allowing a portion of the diaphragm at the actuator post 76 to be pressed into the opening. In some embodiments the area of the opening 84 for a given key is at least as great as the corresponding area of the diaphragm's 56' corresponding key area 80, (See FIG. 16). By having an opening 84 area slightly greater than the corresponding key area 80, there is a tactile sense of travel for a given key 11. More significantly the travel for one key is isolated from the travel of another key, so that when one key is pressed, there is little to no decrease in the gap between actuator posts 76 and contact domes 54 for adjacent keys.

The thickness of the spacer 82 in one embodiment is the height of the contact dome 54, so that the actuator pins 76 are in contact with their corresponding contact domes 54 without compressing such contact domes 54. More preferably, the thickness of the spacer 82 is greater than the height of the contact domes, or otherwise of a height that assures a gap between the apices of the contact domes 54 and the actuator posts 76. The air gap is selected to avoid or at least reduce noise and parasitic capacitance effects within the keyboard. For example, in one embodiment for a keyboard used with a handheld smartphone or information appliance the gap distance is approximately 0.012 inches. For keyboards scaled for smartphones air gaps of approximately 0.008 inches or greater have been found to avoid the noise and parasitic capacitances that make operation less reliable.

To better maintain the diaphragm 56' in precise alignment with the spacer 82 and the circuit board 52, an adhesive layer 86 may be applied between the diaphragm 56' and the spacer 82.

Although contact switches 54 have been described for the various embodiments, in some embodiments the contact switches may be omitted. For example, when a key 11 is pressed an actuator post 76 of the diaphragm 56, 56' may move into physical and electrical contact with the conductive area 66 of the circuit path segment 70 of the circuit board 52. For example, in an embodiment for a tablet computer where the keys are larger, the contact switches 54 may be omitted, and the actuator posts 76 travel into direct physical and electrical contact with the areas 66 of the circuit board 52.

Figure 20:
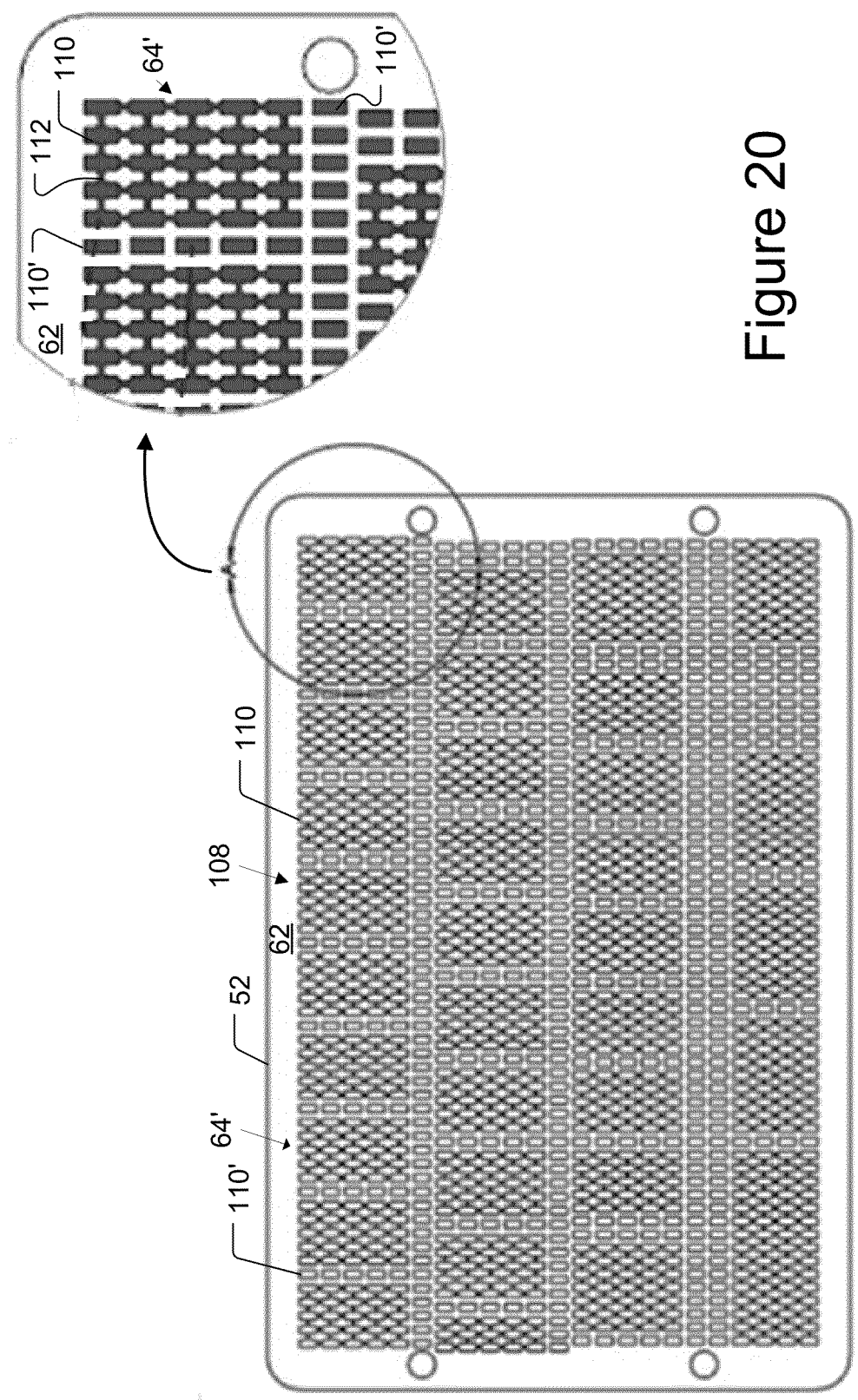
FIG. 20 is a planar view with an enlarged section showing of a pad layout of a circuit board, according to another embodiment of this invention.

Referring to FIG. 20, an alternative embodiment for a layout 108 of contact pads 64' at surface 62 of the circuit board 52' is shown. Because the pads 64/64' may be visible to the user in some embodiments, (e.g., when the keyboard 10 is swung about a hinge axis), it is desirable to make the pads robust and the layout aesthetically pleasing. Each pad 64' is configured as an array of mini-pads 110 linked together by conductive traces 112 to form a small array approximating the size of the pad 64 that would be formed as a single unitary pad structure. For example, a substantial portion of the surface 62 facing the touchscreen 24 may be printed with an array of mini-pads 110 and appear as a dense, decorative array that minimizes the attention to the actual conductive pads 64'. The mini-pads 110 may have any of various shapes (e.g., circles, ellipses, triangles, squares, rectangles, hexagons, polygons). Sets of these mini-pads 110 are connected with traces 112 and one or more vias to the contact areas 66 on the opposite surface 67 of the circuit board 52. In some embodiments there may be mini-pads 110' that are inactive and not part of a pad 64'. As shown some of the mini-pads 110' (e.g., those that occupy rows and columns between the ones linked as pads 64') are merely space fillers, are inactive, and not connected to each other or anything else. These ones may be present for decorative and/or disguise purposes. In some embodiments a thin coating (e.g., ≤0.010 inches) is applied to the surface 62 including the pads 64 or 64' to provide a more aesthetically pleasing look to the underside 62 of the circuit board 52. Because the coating is so thin, the pads 64, 64' remain in electrical contact (i.e., electrical communication) with the touchscreen 24 without being in electrical communication with each other (due to the spacing along the face 62).

Ground Structures

In some embodiments the diaphragm 56, 56' may provide sufficient capacitance to serve as a ground structure, so that the electrostatic field at the virtual key area of the touchscreen 24 contacted during a key press is altered sufficiently for the host device to register a touchscreen input. In particular, when a conductive path is formed between a local area of the touchscreen 24 and the diaphragm 56, 56', the local touchscreen key area 42 of the touchscreen 24 in effect discharges with the charge flowing to the diaphragm 56, 56', which in effect serves as the ground plane for the discharge circuit formed by the closed conductive path.

A preferred manner of self-grounding to assure that the host device registers a touchscreen input for a corresponding key 11 pressing, however, is to ground the touchscreen discharge path to a conductive portion of a capacitive ground structure. The capacitive structure serves as the ground structure providing a ground plane for the discharge circuit formed by the closed conductive path. The capacitive structure need not be a conventional capacitor, nor made from conventional capacitor materials. As used here the capacitive structure for serving as a ground structure is a structure formed by a conductive layer sandwiched between two non-conductive layers. The capacitive structure serves as the ground structure for receiving discharge from the capacitive touchscreen in response to a key 11 pressing operation. The capacitive structure may be leaky allowing accumulated charge to leak out. A benefit of a leaky structure is that the likelihood of the capacitive structure reaching its charge capacity and providing a large, sudden discharge is reduced.

The capacitive structure may be formed entirely local to the keyboard 10, keyboard case 26, keyboard appliance 20, host device case 30, host device housing 23, or host device 22. It is noted that in some embodiments the keyboard appliance case 26, 28 together also form a case for the host device. In other embodiments, a separate structure forms a case for the host device. For example, many bumper structures and other external cases typically are sold for hand held communication devices and information appliances. The keyboard 10 or keyboard case 26 may be fitted to the host device case. For embodiments in which the host device alone provides the ground structure, the keyboard includes a connector which couples to such ground structure, such as by a port or other host device connector.

Figure 21:
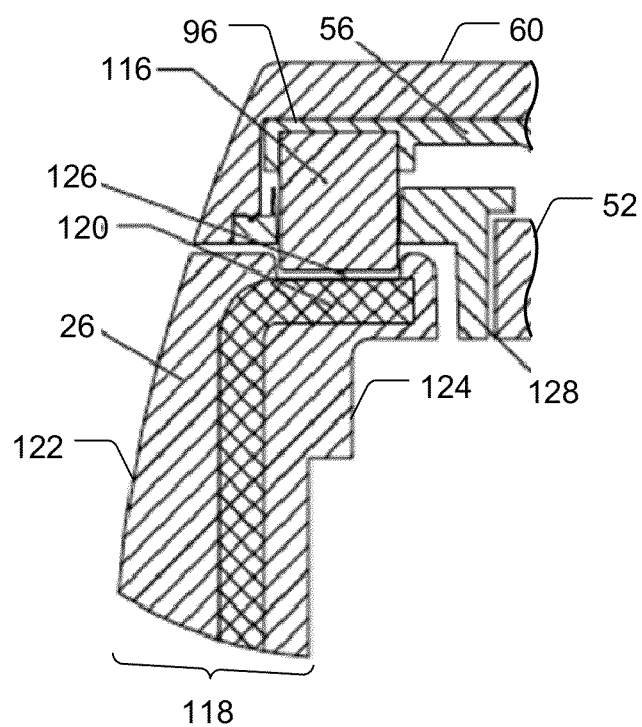
FIG. 21 is a sectional view of a connection between a diaphragm and a ground structure according to another embodiment of the invention.

Referring to FIG. 21, one embodiment of a capacitive structure 118 according to an embodiment of the present invention is shown. The structure 118 is formed by a metal member 120 embedded in or adjacent to the keyboard housing 26. The structure 118 has three layers, including a first non-conductive layer 127 formed by the housing 26, a second conductive layer that is the metal member 120, and a third non-conductive layer 126 that is part of the housing 26 or is applied to the housing 26 to cover the metal plate 120. The metal member 120 is sandwiched between the two non-conductive layers 126, 127.

The electrically conductive portion of the diaphragm 56 is coupled to the metal member 120 by a lead 96 and a magnet 116 toward an edge of the keyboard 10. For example, the magnet 116 may be one of the magnets 46 that serves to hold the keyboard 10 in the operable position to prevent the keyboard from swinging about a hinge axis. In an example embodiment the magnet 116 is seated at the lead 96 and held by a retainer 128 to form a cantilevered structure. When the keyboard 10 is in the operable position, the magnet 116 seats into an opening in the housing 26 revealing a portion of the metal member 120 or of a conductive member that leads to or is otherwise coupled to the metal member 120. The attraction between the magnet 116 and metal member 120 assists in holding the keyboard 10 in the operable position. When the keyboard is pulled away from the touchscreen to swing about a hinge axis, the magnetic attraction is overcome and the electrical connection between the diaphragm 56 and the metal member 120 is severed.

In an example embodiment there may be two magnets 116 corresponding to the two leads 96, 98 (also see FIG. 17) for coupling to the metal member 120, and both forming part of the magnetic latch that holds the keyboard 10 in the operable position. In other embodiments there may be a different number of magnets 116 providing coupling between the diaphragm 56 and the metal member 120. In some embodiments the magnetic latch may include one or more magnets that do not provide an electrical connection between the diaphragm 56 and the metal member 120 during operation, and one or more magnets that do provide an electrical connection between the diaphragm and the metal member 120 during operation.

Figure 22:
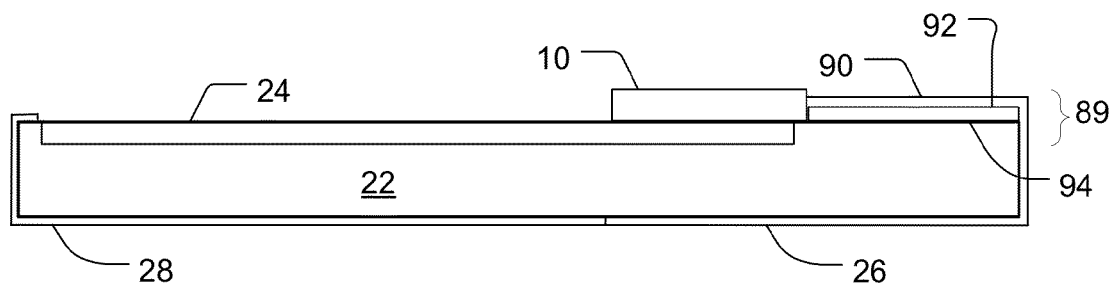
FIG. 22 is a diagrammatic cross-sectional view of a host device and keyboard appliance with a capacitive ground structure formed by the keyboard appliance housing and the host device housing, according to an embodiment of the invention.
Figure 23:
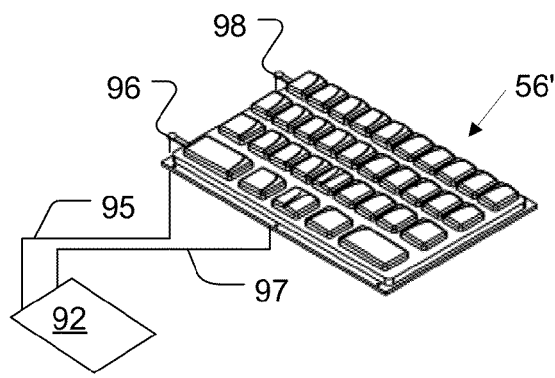
FIG. 23 is partially exploded view showing a conductive layer of the capacitive ground structure of FIG. 22, the keyboard appliance housing and the diaphragm, according to an embodiment of the present invention.
Figure 23:
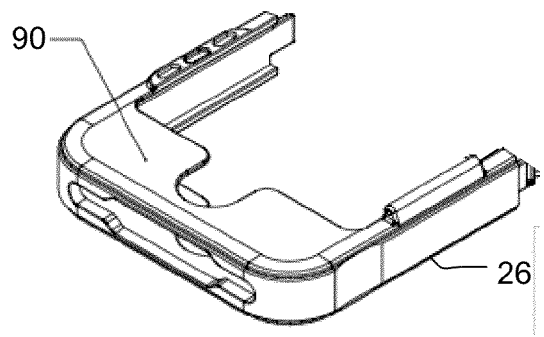

Alternatively, the capacitive structure may be formed with the three layers (i.e., one conductive layer and two non-conductive layers) distributed among any two or more of the keyboard, keyboard housing, keyboard appliance, host device case, host device housing, or host device. In an exemplary embodiment depicted in FIGS. 22-23, the capacitive structure 89 is formed by a non-conductive layer 90 and a conductive layer 92 situated at the keyboard housing 26, and another non-conductive layer 94 at the host device 22 housing. For example, the keyboard housing 26 may be formed by a non-conductive plastic, a resin-based material, or any known electrically insulating material. Such material may serve as one of the non-conductive layers of the capacitive structure 89. The conductive layer 92 may be applied in various manners. For example the conductive material may be painted onto the underside of the housing 26. Alternatively, the conductive material may be a metal applied by a vacuum deposition process onto the underside of the housing 26. In still another alternative, the conductive material may be the metal member 120 exposed at an inner side of the housing 26. Referring to FIG. 23, the diaphragm 56' includes leads 96, 98 which couple the diaphragm 56' to the conductive layer 92 of the capacitive ground structure 89 via conductive lines 95, 97. Alternatively, the diaphragm 56' includes leads 96, 98 which couple the diaphragm 56' to the conductive layer 92 of the capacitive ground structure 89 via conductive lines 95 and/or magnets (e.g., magnets 116 such as per FIG. 21).

For a smartphone-type embodiment, a conductive layer 92 of about 200 sq. mm has been found to form an effective ground structure for reliable keyboard operation. For example, an area 99 at the lower left portion of the keyboard housing 26 may be the location of one or more layers of such capacitive ground structure 89. Other sizes and locations may also provide an effective ground plane structure. The most preferred size and location of the ground plane is dependent upon the touchscreen characteristics, (e.g., electrostatic field voltage/current; discharge capacitance; parallel plate capacitor approximation).

A conventional host device touchscreen is sensitive to capacitances on the order of picofarads to actuate a specific key area. A sensor having a suitably high signal to noise ratio is used by the touchscreen controller to detect minute changes in capacitance. For example, a finger's presence is on the order of a picofarad. Typically, there also are background 'noise' capacitances of 10's of nanofarads. Thus, the need for the touchscreen to use a sensor with a suitably high signal to noise ratio. The touchscreen controller adjusts for unwanted background noise contributors (like a portion of the hand on the screen) and sets a new background noise level. As long as the background is within the SNR capability, single touches can be detected. Accordingly, the touchscreen controller also adjusts for the change in capacitance caused by placing the keyboard 10 with circuit board 52 and pads 64 in contact with the touchscreen surface. Specifically a good signal/noise ratio is maintained for reliable actuation by minimizing the background capacitance "noise" from the keyboard 10 so that only the chosen electrically grounded key contact pad 64 is sensed by the touchscreen control electronics and software.

To minimize parasitic capacitance and other background capacitance noise, the various capacitive contributions from the contact domes, contact dome mounting rings, diaphragm (with the actuator pins and key tops) and the retainer plate have been minimized. Also ground loops or other paths for stray charge to reach areas that would affect the noise are reduced. A 0.062 inch thick circuit board 52 with copper snap dome rings and snap domes 54 has been found to provide robust electrical performance for a keyboard 10. The specific thickness for minimizing background noise to achieve robust keyboard performance may vary for differing touchscreens. For example, the specific thickness and part size may vary for touchscreen having varied parallel flat plate capacitor values. Approximations of a touchscreen's parallel flat plate capacitor values, along with course measurements, and empirical keyboard performance are used to improve design parameters to achieve the most robust performance. To achieve thinner circuit boards and robust performance, circuit board materials may be used that have a lower dielectric constant (e.g., 2) than that (e.g., 4) of a conventional FR4 circuit board material.

One preferred construction for enabling a thinner circuit board is to not allow the actuator posts 76 to rest on the contact domes 54 as would normally be done for conventional keyboard switches. The small additional air gap helps reduce background capacitance or "noise". Experimentally, the stacked components 52, 54, 56/56', 58/80 have been found to provide reliable, effective, discerning touchscreen key registration in response to a key pressing when the total keyboard capacitance during the inactive state (i.e., no keys 11 being actuated) is on the order of tens of picofarads.

Discharge Circuit and Touchscreen Activation Operation

Figure 24:
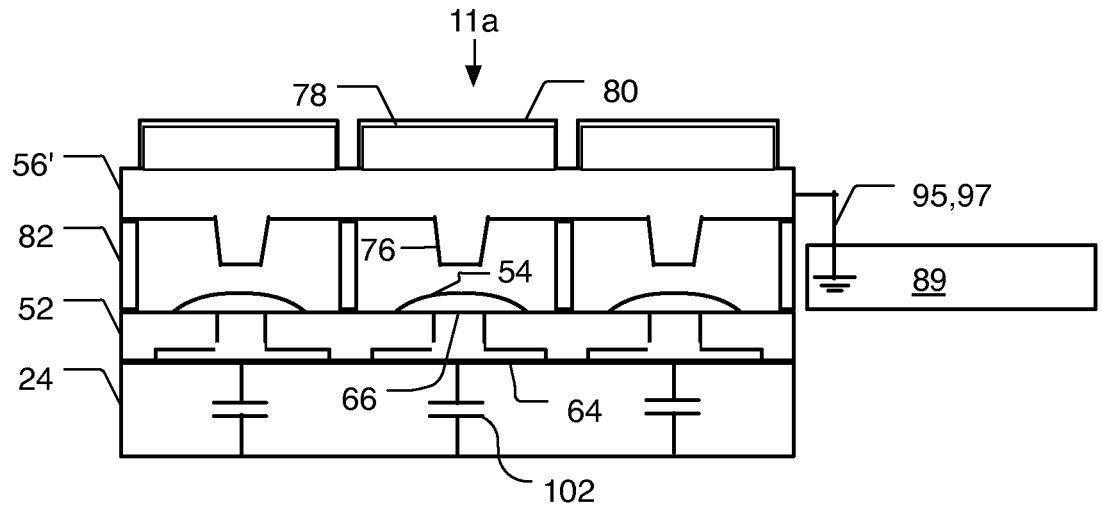
FIG. 24 is a schematic diagram of an exemplary capacitive discharge circuit formed by a keyboard and touchscreen, according to an embodiment of this invention.
Figure 25:
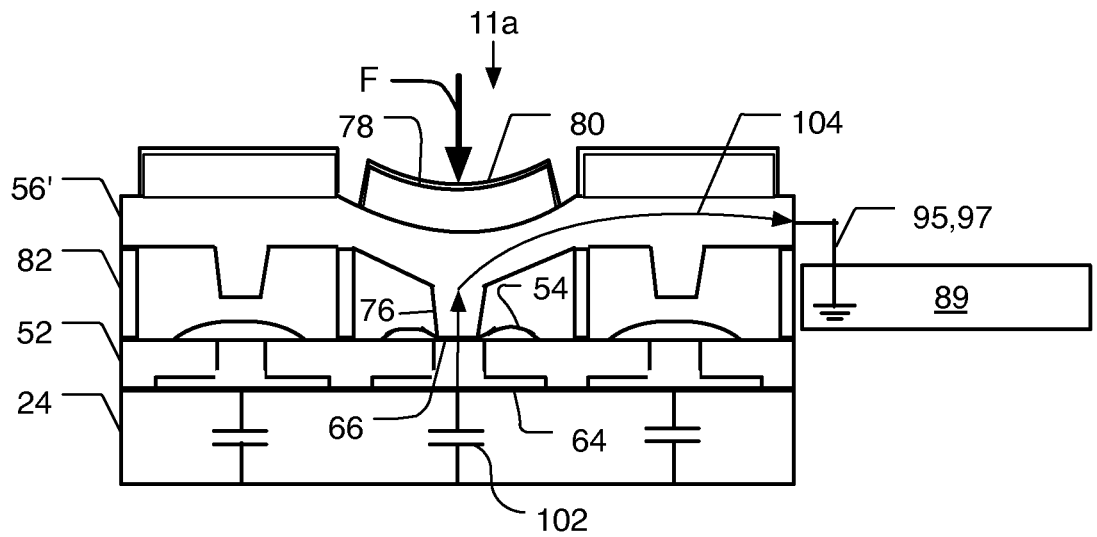
FIG. 25 is a schematic diagram of the capacitive discharge circuit of FIG. 24 in a discharge state, according to an embodiment of this invention.

FIGS. 24-25 show the components of a conductive path that forms a discharge circuit for changing the electrostatic field of the touchscreen in response to a key pressing. The touchscreen 24 includes local areas of activation, such as touchscreen keys 42 (see FIG. 3). A given local area is depicted schematically as a capacitive switch 102, although its actual electrical model may differ depending on the touchscreen technology. When the keyboard 10 is positioned on the touchscreen 24 without any keys 11 being actuated, the actuator posts 76 of the diaphragm 56' are not in contact with their corresponding contact domes 54. The contact domes 56 rest on the circuit board 52, but are not in electrical communication with their corresponding conductive areas 66 of the circuit board 52. However, the contact pads 64 are in physical contact with the touchscreen surface.

When a key 11a is pressed (e.g. by a pressure source F) or otherwise actuated, the actuator post 76 moves into physical contact with its corresponding contact dome 54 and collapses the contact dome to bring the contact dome apex into physical contact with the corresponding conductive area 66 of the circuit board 52. As a result, a conductive path 104 is formed among components corresponding to the actuated key 11a. The conductive path 104 is formed by the corresponding contact pad 64, the corresponding contact 66, the corresponding contact dome 54, and the corresponding actuator post 76. Further, the conductive path 104 includes and provides electrical communication between the ground structure 89 and the corresponding touchscreen area (and its capacitive switch 102). The capacitive sensitivity of the conductive circuit changes the electrostatic field of the touchscreen, and in effect causes the discharge of the capacitive switch 102—or otherwise varies the electrostatic field of the touchscreen according to the touchscreen technology. The discharge flows into the capacitive ground structure 89, where it is stored until it leaks out. For example, when charge has built up in the capacitive ground structure 89, physical contact with the ground structure 89 (e.g., at one of the non-conductive layers, such as at case 26 or the host device housing) will cause some of the charge to leak out to the hand, or other body part or structure coming into such physical contact.

Although the circuit of FIGS. 24-25, is shown to include contact domes 54, in other embodiments the contact domes may be omitted and the actuator posts 76 moved into direct contact with the corresponding conductive contact areas 66 of the circuit board 52. Although the spacer 82 is shown to provide the normal spacing gap between the actuator posts 76 and their corresponding contact domes 54, in other embodiments spacer posts 77 may be used instead. Although the diaphragm 56' having elevated key areas is shown, in other embodiments the diaphragm 56 may be included instead; and multiple key cap structures may be attached to the diaphragm 56 or a unitary keycap structure 58 having multiple key cap regions that overlay the diaphragm 56. Further, although a ground structure distinct from the diaphragm 56' is shown, in other embodiments the diaphragm 56, 56' may serve as the ground structure.

Figure 26:
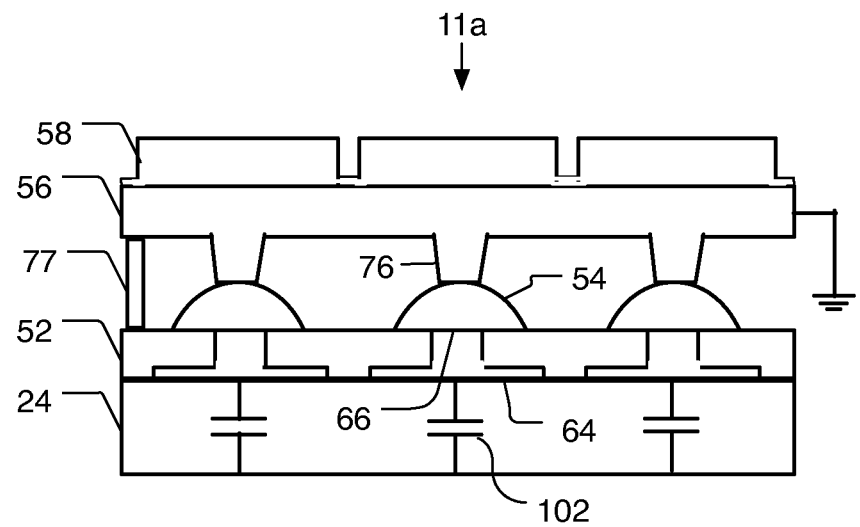
FIG. 26 is a schematic diagram of exemplary capacitive discharge circuits formed by a keyboard and touchscreen, according to another embodiment of this invention.
Figure 27:
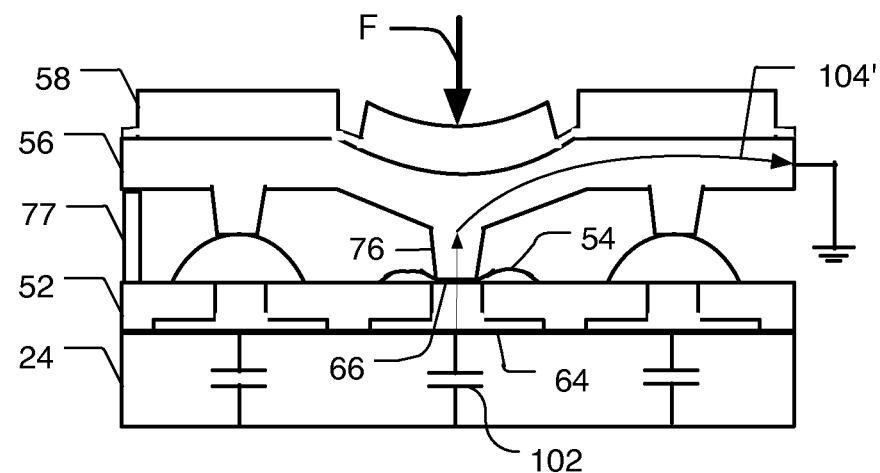
FIG. 27 is a schematic diagram of the capacitive discharge circuit of FIG. 26 in a discharge state, according to the another embodiment of this invention.

FIGS. 26-27 show another embodiment of the components of a conductive path that forms a discharge circuit for discharging the capacitive switch 102 (or otherwise changing the electrostatic field of the touchscreen) in response to a key pressing. Like parts are given like part numbers. In comparison to the embodiment shown in FIGS. 24-25, the embodiment of FIGS. 26-27 has the actuator posts 76 in contact with their corresponding contact domes 54—even when a key is not being actuated. The contact domes 54 rest on the circuit board 52, but are not in electrical communication with their corresponding conductive areas 66 of the circuit board 52. Accordingly, it is only the contact domes 54 that keep the conductive path between the capacitive switch 102 and the ground structure 89 from being closed. In contrast, for the embodiment of FIGS. 24-25 an air gap between the actuator posts 76 and the contact domes 54 also provides isolation while a key is not being actuated.

When a key 11a is pressed or otherwise actuated, the actuator post 76 collapses the corresponding contact dome 54 to bring the contact dome apex into physical contact with the corresponding conductive area 66 of the circuit board 52. As a result, a conductive path 104' is formed among components corresponding to the actuated key 11a. The conductive path 104' is formed by the corresponding contact pad 64, the corresponding contact 66, the corresponding contact dome 54, and the corresponding actuator post 76. Further, the conductive path 104' may include and provide electrical communication between a ground structure 89 and the corresponding touchscreen area (and its capacitive switch 102). The capacitive sensitivity of the conductive circuit may for example change the electrostatic field of the touchscreen, and in effect cause a discharge of the corresponding capacitive switch 102. The discharge flows into the capacitive ground structure 89, where it is stored until it leaks out, as previously described.

Figure 28:
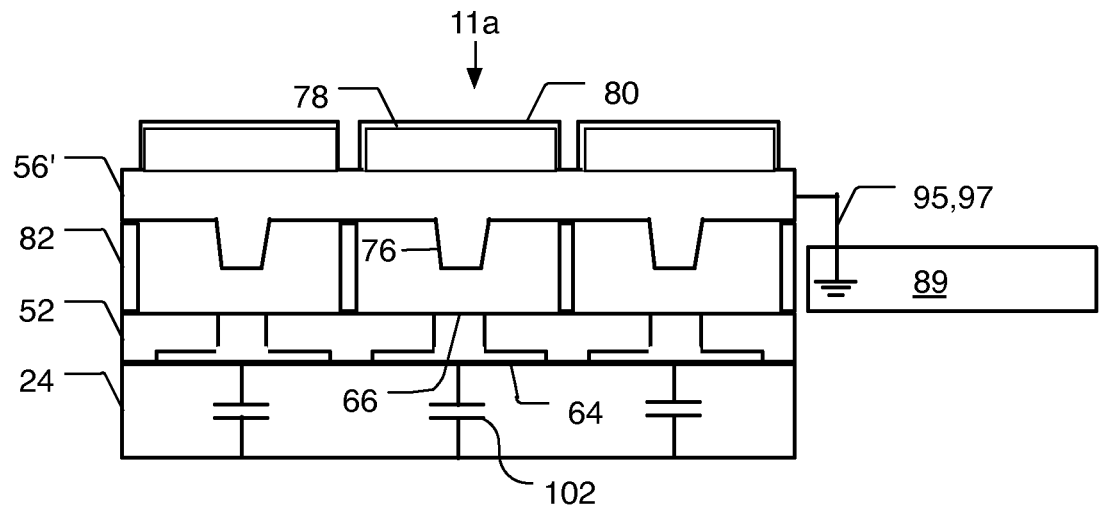
FIG. 28 is a schematic diagram of exemplary capacitive discharge circuits formed by a keyboard and touchscreen, according to yet another embodiment of this invention.
Figure 29:
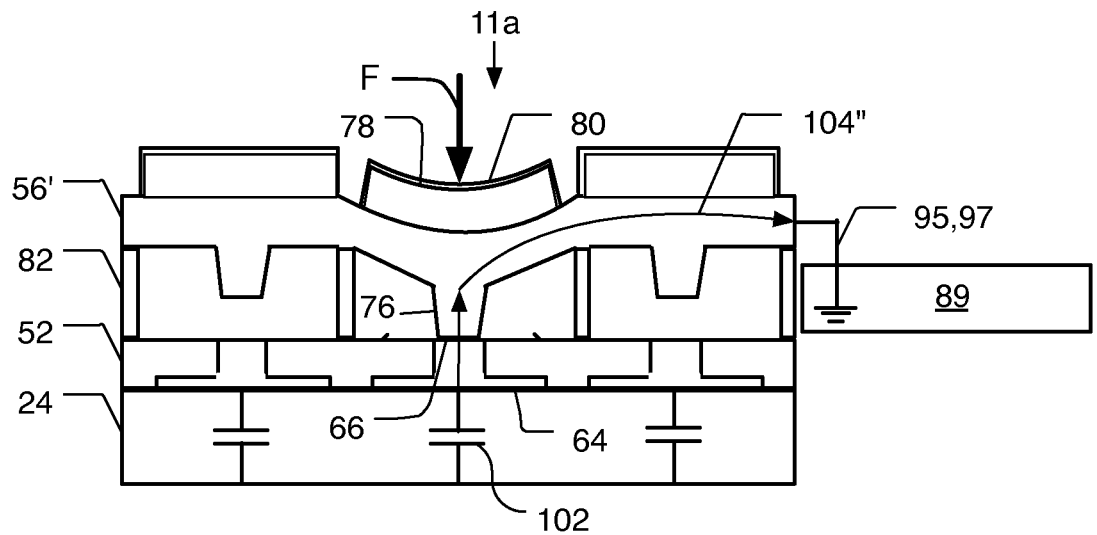
FIG. 29 is a schematic diagram of the capacitive discharge circuit of FIG. 28 in a discharge state, according to the yet another embodiment of this invention.

FIGS. 28-29 show yet another embodiment of the components of a conductive path that forms a discharge circuit for discharging the capacitive switch 102 (or otherwise changing the electrostatic field of the touchscreen) in response to a key pressing. Like parts are given like part numbers. In comparison to the embodiment shown in FIGS. 24-25, the embodiment of FIGS. 28-29 omits the contact domes. Thus, the actuator posts 76 move into direct contact with the corresponding conductive contact areas 66 of the circuit board 52.

When a key 11a is pressed or otherwise actuated, the actuator post 76 moves into physical contact with the corresponding conductive area 66 of the circuit board 52. As a result, a conductive path 104" is formed among components corresponding to the actuated key 11a. The conductive path 104" is formed by the corresponding contact pad 64, the corresponding contact 66, and the corresponding actuator post 76. Further, the conductive path 104" may include and provide electrical communication between a ground structure 89 and the corresponding touchscreen area (and its capacitive switch 102). The capacitive sensitivity of the conductive circuit may for example change the electrostatic field of the touchscreen, and in effect cause a discharge of the corresponding capacitive switch 102. The discharge flows into the capacitive ground structure 89, where it is stored until it leaks out, as previously described.

Other Remarks

The keyboard 10 includes a plurality of keys 11. For each key, there is a corresponding pad 64 (or set of mini-pads) in a corresponding circuit segment 70 coupled to a corresponding contact 66. For embodiments having contact domes 54, there also is a corresponding contact dome 54 For each key 11 there also is a corresponding actuator post 76 on a diaphragm, and a corresponding surface to be contacted by a finger/stylus to press the key. The contacted surface may be a separate key cap structure or a portion of a unitary keycap structure (having contact surfaces for all the keys), Alternatively, the contact surface may be a non-conductive portion of the diaphragm—in an embodiment without a keycap structure that is distinct from the diaphragm. Accordingly, for each key 11 there is at least one of each of a pad 64, an actuator post 76, and contact surface corresponding to the key 11. In a preferred embodiment there also is at least one contact 66 for each key 11. In other embodiments there also may be at least one contact dome 54 for each key 11.

For each key 11, there also is a corresponding discharge path conductively coupling an area of the touchscreen at the corresponding pad 64 to the ground structure. At least the portion of the discharge path from a contact pad 64 up to, but excluding the actuator post 76 is a separate unique path portion for a given key 11, (i.e., it is not shared by other keys 11 and their corresponding keyboard components). The portion of the discharge path from the actuator post 76 to the ground structure may be a common path (e.g., a common conductive structure serving all keys 11). Alternatively there also may be a unique path portion (not shared for the other keys 11) for each given key 11 from the actuator post 76 up to but excluding the common ground structure 89. For example, the unique path portion may be a conductive trace from the actuator post to the common ground structure 89.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. The invention is intended to extend to all functionally equivalent structures, methods and uses, such as are within the scope of the appended claims. Those skilled in the art, having the benefit of the teachings of this specification, may affect numerous modifications thereto and changes may be made in form and details without departing from the scope and spirit of the invention.

What is claimed is:

1. A keyboard that activates registration of a user input by a touchscreen, which underlies the keyboard, in response to a user applying a pressing force of a pressure source into contact with the keyboard, wherein the keyboard responds to said pressing force by forming a discharge path for an area of the touchscreen corresponding to a pressed key of the keyboard, the touchscreen being a capacitive discharge touchscreen of a type that registers user input in response to touch by discharging from a touched area of the touchscreen, the touchscreen discharging said area corresponding to said pressed key into said keyboard along the formed discharge path, the keyboard comprising:

a plurality of keys by which the pressure source applies physical contact with the keyboard;

a corresponding plurality of non-conductive areas configured to electrically isolate the touchscreen from the pressure source at a location of said physical contact between the pressure source and the keyboard; and a deformable diaphragm having a portion that is electrically conductive, said electrically conductive portion comprising either one of all or less than all of the diaphragm;

wherein a first key among said plurality of keys is configured to be activated in response to application of said pressing force to said first key; and wherein in response to activation of said first key, said discharge path, which excludes said pressure source, is formed between said contacted touchscreen area corresponding to the activated first key and at least the diaphragm, the diaphragm being electrically isolated from said pressure source, which presses said activated first key, by at least said corresponding non-conductive area to exclude the pressure source from the discharge path by which the touchscreen registers said input in response to said activation of said first key.

2. The keyboard of claim 1, further comprising a corresponding plurality of pads in electrical communication with the touchscreen.

3. The keyboard of claim 2, further comprising:
a corresponding plurality of contact switches; and
wherein in response to said activation of said first key the corresponding contact switch is altered to close a circuit path between said corresponding touchscreen area and said electrically conductive portion of the diaphragm, the circuit path including said corresponding pad, said circuit path being said discharge path.

4. The keyboard of claim 3, wherein the diaphragm is in physical and electrical communication with the plurality of contact switches, wherein said corresponding plurality of contact switches are in physical communication with said printed circuit board, and wherein while the activated key is activated, the corresponding contact switch establishes electrical communication with the corresponding contact at said second face of the printed circuit board to close said circuit path between the corresponding pad and the electrically conductive portion of the diaphragm.

5. The keyboard of claim 2, wherein the diaphragm comprises a corresponding plurality of actuator posts; and
wherein in response to said activation of said first key the corresponding actuator post moves to close a circuit path between said corresponding touchscreen area and said electrically conductive portion of the diaphragm, said circuit path including said corresponding pad, said circuit path being said discharge path.

6. The keyboard of claim 5, further comprising a corresponding plurality of contact switches; and
wherein in response to said activation of said first key the corresponding actuator post alters the corresponding contact switch to close the circuit path between said corresponding touchscreen area and electrically conductive portion of the diaphragm, said circuit path including said corresponding pad.

7. The keyboard of claim 2, wherein each one of the corresponding plurality of pads remains in electrical communication with the touchscreen during operation of the keyboard; and wherein each one of the corresponding plurality of pads is electrically isolated from the electrically conductive portion of the diaphragm while the corresponding key is not activated.

8. The keyboard of claim 2, further comprising a printed circuit board, the printed circuit board comprising said corresponding plurality of pads at one face of the printed circuit board and a corresponding plurality of contacts at a second, opposite face of the printed circuit board, wherein each one of the pads is in electrical communication with a corresponding one of the contacts.

9. The keyboard of claim 8, wherein the diaphragm comprises a corresponding plurality of actuator posts, and wherein for each one key there is a gap between the corresponding actuator post and the corresponding contact.

10. The keyboard of claim 9, further comprising a corresponding plurality of contact switches, and wherein for an unpressed key of said plurality of keys a corresponding one of the contact switches spans said gap.

11. The keyboard of claim 9, further comprising a corresponding plurality of contact switches, wherein a corresponding one of the contact switches is located within said gap, and wherein for an unpressed key of said plurality of keys there is an air gap between said corresponding actuator post and said corresponding contact switch, said air gap being traversed when said unpressed key is pressed so that the corresponding actuator post moves into contact with the corresponding contact switch.

12. The keyboard of claim 8,
wherein each one of the corresponding plurality of pads is electrically isolated from the electrically conductive portion of the diaphragm while the corresponding key is not activated;
wherein for each one key in a normal unpressed state there is a gap between the circuit board and the diaphragm; and
wherein while the activated key is activated, a portion of the electrically conductive portion of the diaphragm comes into electrical communication with the corresponding contact of the circuit board to close said circuit path between the corresponding pad and the diaphragm.

13. The keyboard of claim 1, wherein the diaphragm comprises a plurality of elevated key areas corresponding to the plurality of keys, and wherein the plurality of keys are non-conductive key caps which reside on the corresponding elevated key areas, and wherein said corresponding plurality of non-conductive areas are formed by said non-conductive key caps.

14. The keyboard of claim 1, further comprising a unitary structure having a plurality of regions, each region being one of the plurality of keys, the unitary structure being deformable in response to pressing of any region of said plurality of regions.

15. The keyboard of claim 14, wherein an underside face of the unitary structure is in physical contact with a face of the diaphragm, wherein the diaphragm is deformable, and wherein during activation of said key, the region of the unitary structure corresponding to the key is deformed, which in turn deforms an underlying portion of the diaphragm, the underlying portion in turn causing the discharge path to be closed.

16. The keyboard of claim 1, wherein the diaphragm serves as an electrical ground plane that absorbs discharge from said area of the touchscreen corresponding to the activated first key so as to allow the touchscreen to register an input at said area of the touchscreen corresponding to the activated first key.

17. The keyboard of claim 1, wherein the diaphragm is electrically coupled to an electrical ground plane.

18. The keyboard of claim 1, wherein the diaphragm is electrically coupled to an electrical ground plane through a cantilevered magnetic latch.

19. The keyboard of claim 1, further comprising a housing for engaging a host device of the touchscreen, wherein the diaphragm is electrically coupled to a capacitive ground structure through a cantilevered magnetic latch, the capacitive ground structure formed at least in part by a conductive member and the housing, said capacitive ground structure being in electrical communication with said discharge path to absorb discharge from said area of the touchscreen corresponding to the activated first key so as to allow the touchscreen to register an input at said area of the touchscreen corresponding to the activated first key.

20. The keyboard of claim 19, wherein the capacitive ground structure is a leaky capacitive structure which leaks capacitance, thereby allowing the ground structure to have capacity to repeatedly absorb discharge from one or more activated areas of the touchscreen.

21. The keyboard of claim 1, for use with a host device including said touchscreen, and further comprising a conductive path from the diaphragm to a ground plane formed between the keyboard and the host device.

22. The keyboard of claim 1, for use with a host device including said touchscreen, and further comprising a conductive path from the diaphragm to a ground formed between the keyboard and a housing of the host device.

23. The keyboard of claim 1, for use with a host device including said touchscreen, and further comprising a conductive path from the diaphragm to a ground formed between the keyboard and a case of the host device.

24. The keyboard of claim 1, further comprising a ground structure that stores capacitance, said ground structure being in electrical communication with said discharge path to absorb discharge from said area of the touchscreen corresponding to the activated first key so as to allow the touchscreen to register an input at said area of the touchscreen corresponding to the activated first key, wherein said ground structure comprises a conductive layer sandwiched between two non-conductive layers.

25. The keyboard of claim 1 for use with a host device including said touchscreen, and further comprising at least a portion of a ground structure that stores capacitance, said ground structure being in electrical communication with said discharge path to absorb discharge from said area of the touchscreen corresponding to the activated first key so as to allow the touchscreen to register an input at said area of the touchscreen corresponding to the activated first key, wherein said keyboard comprises a conductive layer and a first non-conductive layer of said ground structure, and wherein a second non-conductive layer of said ground structure is configured as a non-conductive external surface of said host device or a case of said host device, the capacitive structure being configured with the conductive layer sandwiched between the first and second non-conductive layers while the keyboard overlays the touchscreen for keyboard operation.

26. The keyboard of claim 1 in combination with said touchscreen, wherein the touchscreen is configured to adjust for a change in capacitance load caused when the keyboard is positioned to overly and contact a touch surface of said touchscreen by adjusting a background capacitance noise level against which a touchscreen input can be discerned; and
wherein the keyboard is configured so that said change in capacitance load is within a signal to noise ratio capability of said touchscreen, thereby allowing a further change of said capacitance load, which occurs when said discharge path is formed between said contacted touchscreen area corresponding to the activated first key and the diaphragm while the pressure source is electrically isolated from the discharge path by a corresponding one of said plurality of non-conductive areas, to be registered as a touch by the touchscreen.

27. The keyboard of claim 26 configured as a mechanical keyboard wherein each one key of said plurality of keys is configured for activation in which all action for such activation consists of mechanical, non-electrical action responsive to application of said pressing force to said one key.

28. The keyboard of claim 26 wherein all electrical input to the keyboard during operation of the keyboard to activate registration of the user input by the touchscreen consists of capacitive discharge from said contacted touchscreen area.

29. The keyboard of claim 1 configured as a mechanical keyboard wherein each one key of said plurality of keys is configured for activation in which all action for such activation consists of mechanical, non-electrical action responsive to application of said pressing force to said one key.

30. The keyboard of claim 1 wherein all electrical input to the keyboard during operation of the keyboard to activate registration of the user input by the touchscreen consists of capacitive discharge from said contacted touchscreen area.

31. A method of activating an area of a touchscreen corresponding to a touchscreen key of a touchscreen key set, comprising:
overlaying a keyboard apparatus onto an external surface of the touchscreen, whereby physical contact is made and maintained between the touchscreen and a plurality of contact surfaces of the keyboard apparatus at multiple touchscreen areas configured to receive touchscreen key inputs, the keyboard apparatus having a plurality of keys;
receiving at a first key of the keyboard apparatus a pressing force of a pressure source contacting the first key, wherein said pressing force activates said first key;
closing an electrical circuit path within the keyboard in response to activation of said first key, said closed electrical circuit path extending from a first contact surface among said plurality of contact surfaces corresponding to said first key to a capacitive ground structure, said first contact surface being in physical contact with a first touchscreen area among said multiple touchscreen areas corresponding to the first key, said capacitive ground structure comprising a conductive layer sandwiched between a first non-conductive layer and a second non-conductive layer, at least the conductive layer and the first non-conductive layer being part of the keyboard apparatus; and
discharging said first touchscreen area corresponding to the first key when said electrical circuit path is closed, said discharging occurring through said electrical circuit path with discharge from said first touchscreen area being absorbed by said capacitive ground structure so that the touchscreen registers a touch input at said first touchscreen area; and
wherein said touchscreen is electrically isolated from the pressure source at a location of physical contact between the pressure source and the first key by a non-conductive area corresponding to the first key so that the pressure source where contacting the first key does not form part of the electrical circuit path or capacitive ground structure during said receiving, closing and discharging.

32. The method of claim 31, wherein said pressing force alters a contact switch corresponding to the first key to close the electrical circuit path.

33. The method of claim 31, further comprising moving an actuator corresponding to the first key across an air gap to close the electrical circuit path between the pad in contact with said corresponding switch area and the capacitive ground structure.

34. The method of claim 31, further comprising moving an actuator corresponding to the first key across an air gap into contact with a contact switch corresponding to the first key and altering the contact switch to close the electrical circuit path between the pad in contact with said corresponding switch area and the capacitive ground structure.

35. The method of claim 31, wherein the capacitive ground structure accumulates charge as keys of the keyboard apparatus are activated and the touchscreen discharges, and further comprising leaking accumulated charge from said capacitive ground structure so as to reduce potential for reaching a charging capacity of the capacitive ground structure.

36. The method of claim 31, further comprising, after said overlaying, adjusting by the touchscreen for a change in capacitance load caused said plurality of contact surfaces of the keyboard apparatus contacting said multiple touchscreen areas, said adjusting comprising adjusting a background capacitance noise level against which a touchscreen input can be discerned, wherein the keyboard apparatus is configured so that said change in capacitance load is within a signal to noise ratio capability of said touchscreen, thereby allowing a further change of capacitance caused by said closing said electrical circuit path and said discharging through said electrical circuit path to be registered as a touch by the touchscreen.

37. The method of claim 31 wherein each one key of said plurality of keys is configured for activation in which all action for such activation consists of mechanical, non-electrical action responsive to application of said pressing force to said one key.

38. The method of claim 31 wherein all electrical input for operation of the keyboard apparatus to activate registration of the user input by the touchscreen consists of capacitive discharge from said contacted touchscreen area.

\* \* \* \* \*